United States Patent Office 3,032,461
Patented May 1, 1962

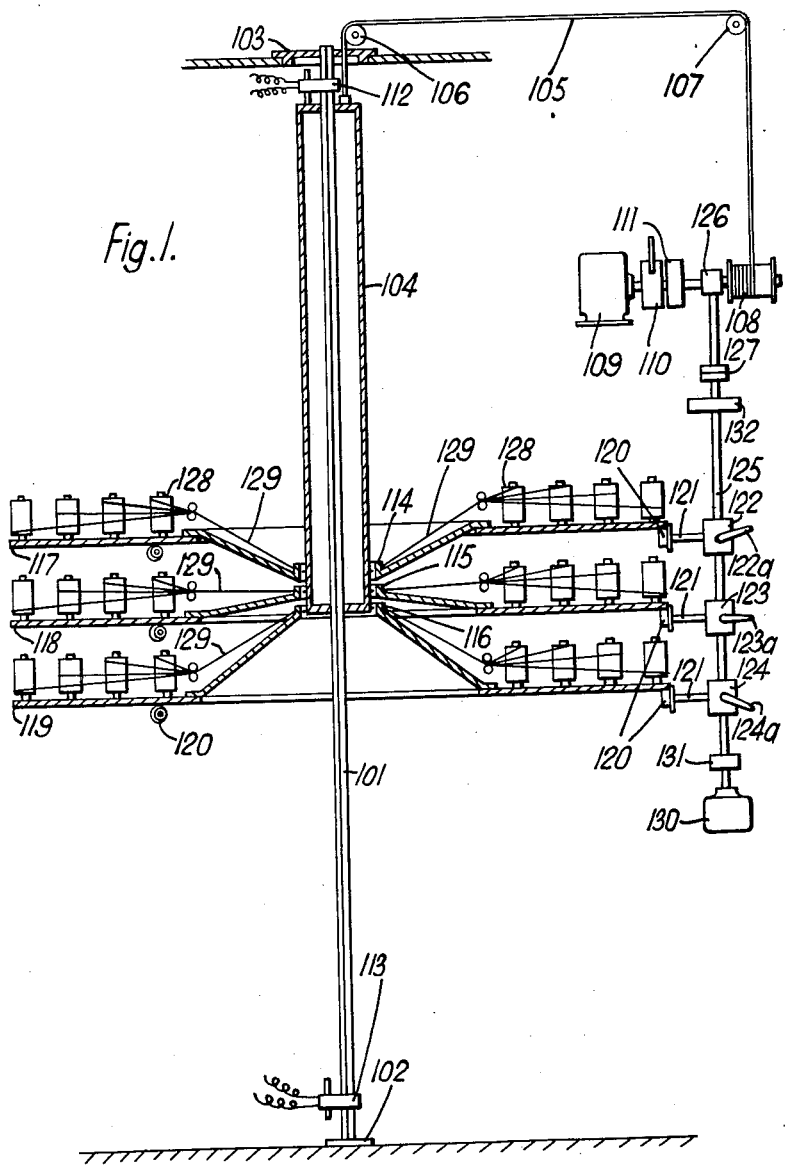

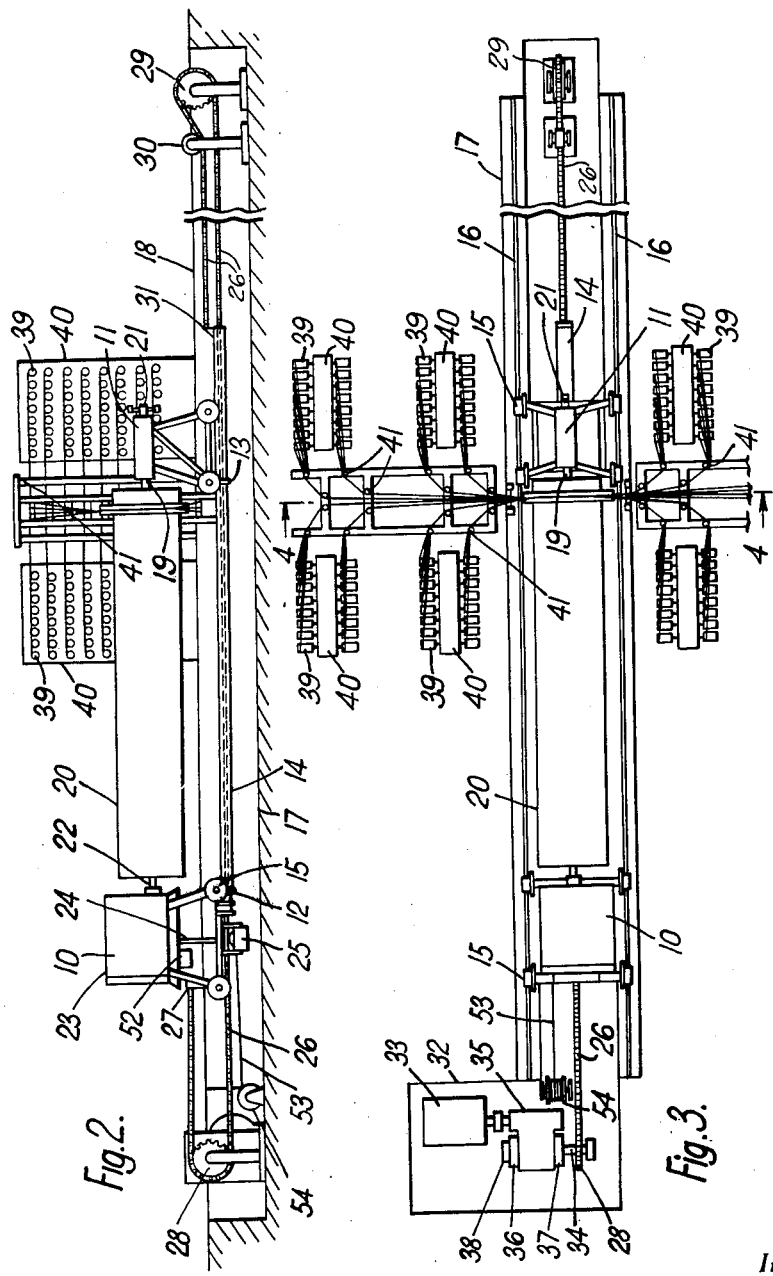

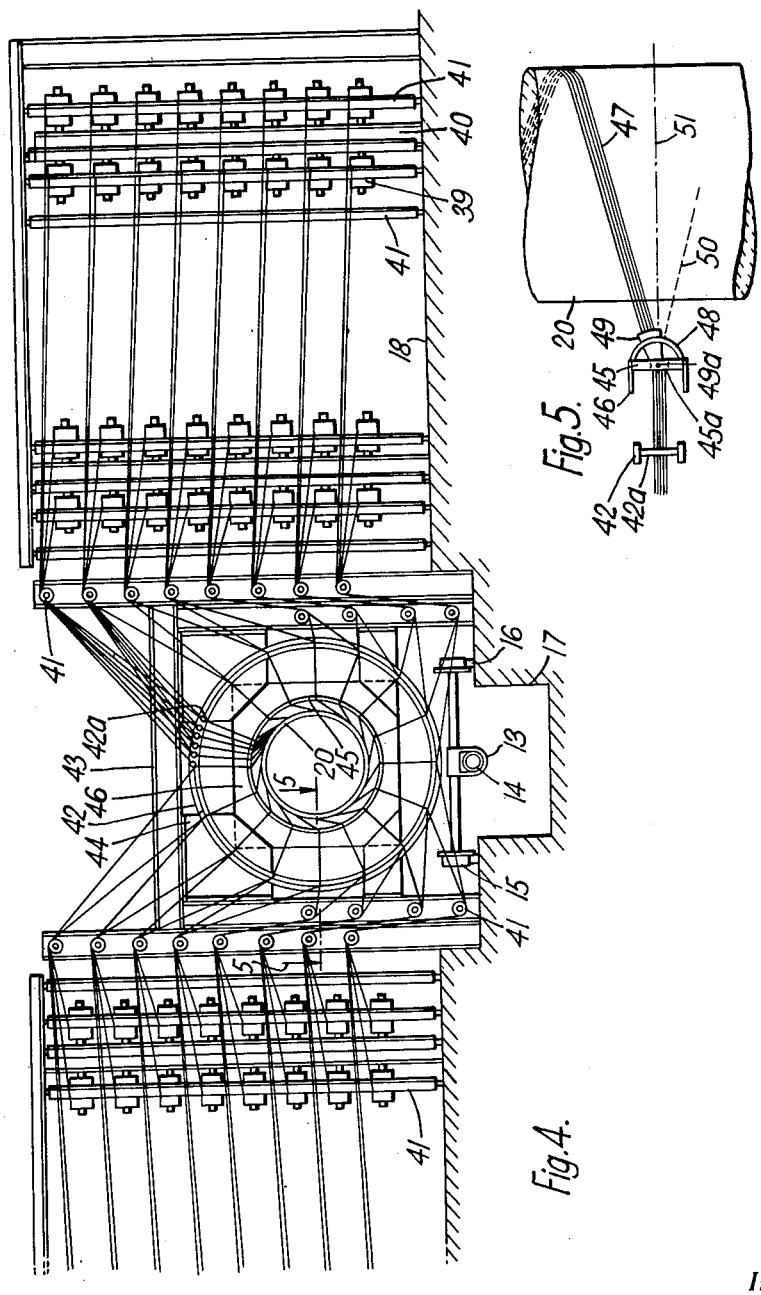

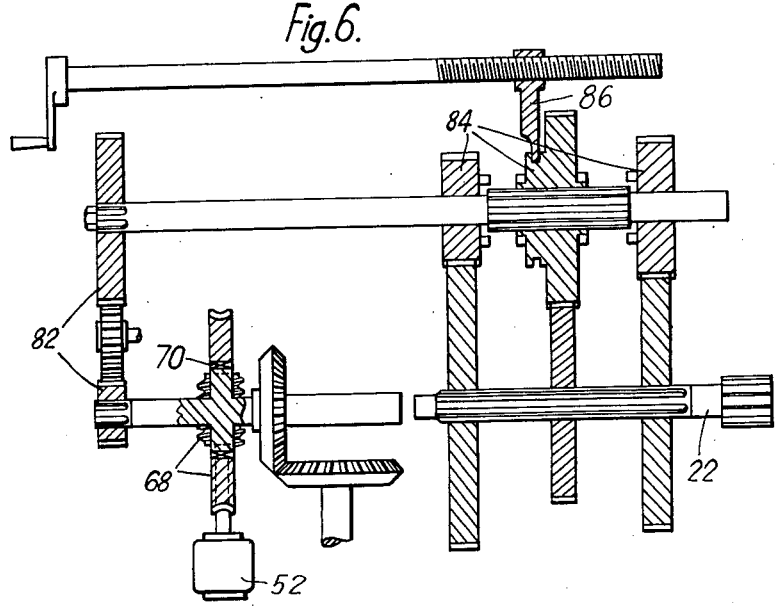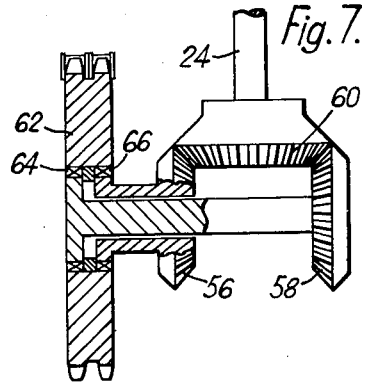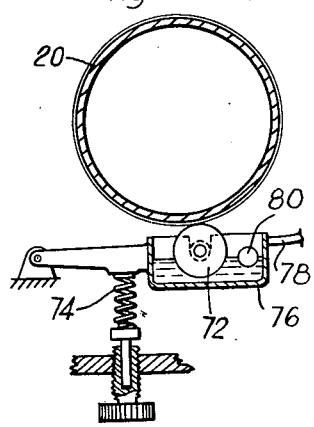

3,032,461
MANUFACTURE OF HOLLOW ARTICLES
FROM THREAD
William Andrew Baker and Donald Arthur Shoemack, Bristol, England, assignors to Bristol Aircraft Limited, Bristol, England, a British company
Filed Mar. 5, 1959, Ser. No. 797,449
Claims priority, application Great Britain Mar. 10, 1958
14 Claims. (Cl. 156—175)

This invention relates to methods and machines for making pipe and other elongated hollow articles of circular or approximately circular cross-section, having a wall composed of a plurality of layers of helical or approximately helical turns of thread, the threads of successive layers crossing one another, and the turns and layers being bonded together with a solid resinous substance. The term "thread" as used herein is intended to include multi-fibre roving, spun yarn and single filament thread-like materials, and the term "layer" is intended to mean a complete covering of the surface upon which the thread is laid, substantially without spaces between the turns constituting the layer.

According to the present invention a method of making such articles includes producing relative reciprocating movement between a mandrel and a thread guide peripherally surrounding the mandrel with clearance, the mandrel always remaining within the thread guide until the winding has been completed, producing relative rotation between the thread guide and the mandrel at a speed which during the greater part of the period of each pass of the mandrel relatively to the thread guide is directly proportional to the speed of relative reciprocation, but which speed is maintained at a positive value during reversals of direction of the reciprocating movement, and feeding a sufficient number of threads in peripherally distributed arrangement through the thread guide onto the surface of the mandrel to form a layer at each pass.

The bonding substance, which may be for example a settable liquid resin of the polyester, epoxide or phenol-formaldehyde types, may be applied to each thread individually as it approaches the mandrel, or it may be applied progressively to the partially completed winding or subsequently to the wholly completed winding. In some cases it is alternatively possible to apply a resin in liquid state to the thread, partially polymerise the resin to a dry state so that it can be wound upon supply bobbins, and then wind the thread upon the mandrel. In any case, when the winding has been completed it will be necessary to establish conditions appropriate for fully curing or otherwise causing the bonding substance to set. Suitable methods of applying and causing a bonding substance to set are well known in the art and further description is not considered necessary. After the bonding substance has been set the mandrel may be removed, or in some cases it may be retained as part of the article.

According to a feature of the invention the method may include applying more than one layer of thread to the mandrel at each pass by feeding to each of a corresponding number of thread guides, spaced apart longitudinally of the mandrel, a sufficient number of threads in peripherally distributed arrangement to form a layer at each pass.

With this feature the speed relation which is maintained during the greater part of the period of each pass between the rate of relative rotation of one of the thread guides and the mandrel and the rate of relative reciprocation should be different (which includes opposite) from the speed relation so maintained pertaining to an adjacent thread guide and the mandrel. The effect of this is to wind successive layers in which the threads in one layer cross those in the next adjacent layer, which is advantageous for obtaining even winding and desirable strength characteristics in the finished article. When successive layers are wound with threads from the same thread guides by reversal of the direction of longitudinal movement of the mandrel the crossing effect is obtained by the reversal of hand of the winding.

According to a further feature of the invention the speed relation which is maintained for one thread guide during the greater part of one pass may be different from the speed relation which is maintained for the same thread guide during the greater part of another pass. The effect of this is to change both the angle at which the threads lie in the two layers and also the amount of thread used in forming the layers, so that they are of different thickness.

Machines according to the present invention comprise means for producing relative reciprocating movement between a mandrel of circular or approximately circular cross section and a thread guide peripherally surrounding the mandrel with clearance, the reciprocating means including means for determining the length of each pass so that the mandrel remains within the thread guide, means for producing relative rotation between the thread guide and the mandrel at a speed which during the greater part of the period of each pass is directly proportional to the speed of relative reciprocation but is always in the same direction during successive passes, means for maintaining the relative rotation at a positive value during reversals of direction of the reciprocating movement, and means for supplying a plurality of threads peripherally distributed to the thread guide.

One form of machine includes means for reciprocating the mandrel vertically in the direction of its length, a ring-shaped thread guide surrounding the axis of reciprocation of the mandrel, means associated with the thread guide for supporting a multiplicity of bobbins or the like and for guiding thread from the bobbins or the like in peripheral distribution to the ring-shaped guide, means for rotating the ring-shaped guide and the associated means at a speed dependent upon the instantaneous speed of translation of the mandrel but always in the same direction during successive passes, and means for maintaining the guide and associated means in rotation during reversals of direction of the longitudinal movement of the mandrel.

A preferred form of machine includes means for reciprocating the mandrel in the direction of its length, means for rotating the mandrel at a speed dependent upon the instantaneous speed of translation, but always in the same direction during successive passes, means for maintaining the mandrel in rotation during reversals of direction of the longitudinal movements, a stationary ring-shaped thread guide surrounding the axis of rotation of the mandrel, a stationary creel for a multiplicity of bobbins or the like of thread, and means for guiding thread from the bobbins or the like in peripheral distribution to the ring-shaped thread guide.

The ring-shaped thread guide may include a ring formed with a multiplicity of holes, and a thread spreader associated with each of the holes for spreading a group of threads passing from the hole to the surface of the mandrel.

In the accompanying drawings two constructional examples are given of machines according to the invention.

In the drawings:

FIGURE 1 shows schematically in vertical section a machine with three rotating thread guides, the mandrel being reciprocated vertically;

FIGURE 2 is a side view of a machine with a single stationary thread guide and a horizontally reciprocated mandrel, certin parts being omitted for clarity and the emplacement being sectioned;

FIGURE 3 is a plan view of the machine shown in FIGURE 2;

FIGURE 4 is a section taken approximately on the line 4—4 in FIGURE 3;

FIGURE 5 is an explanatory diagram corresponding approximately to a section on the line 5—5 in FIGURE 4;

FIGURES 6 and 7 are diagrams of gearing; and

FIGURE 8 is a diagram of means for applying resin.

The machine shown in FIGURE 1 comprises a vertical spindle 101 fixed to a base as at 102 and supported at its upper end by a removable steady 103. An exchangeable mandrel 104, which is shown as substantially cylindrical externally, as would be suitable for making pipes, is mounted on the spindle so that it can slide freely up and down, but the spindle is of square or other suitable shape to prevent rotation of the mandrel upon it. The mandrel 104 is drawn up the spindle by a cable 105 passing over guide pulleys 106, 107 to a winch 108 driven by a constant-speed electric motor 109 through a reversing gear box 110 of a kind employing friction clutches or brakes to effect reversal. A brake 111 may also be provided to bring the winch to a standstill after the drive in one direction has been interrupted and before the drive in the reverse direction is engaged. The mandrel 104 thus ascends under power but descends under its own weight, the motor acting as a speed-limiting device. Limit switches 112, 113 are adjustably mounted on the spindle 101 to control the reversing of the winch 108 to produce reciprocations of the mandrel of desired length.

Three ring-shaped thread guides 114, 115 and 116 surround the mandrel and are carried respectively by circular creels 117, 118 and 119 for thread bobbins. The outer edges of the creels constitute rails each running upon three rubber-tired flanged wheels 120. One of these wheels pertaining to each creel is driven by shafts 121 from variable speed gear boxes 122, 123 and 124 respectively, which are themselves all driven by shafting 125 from an angle-drive gearbox 126 in the drive shaft between the reversing gearbox 110 and the winch 108. Levers 122a, 123a and 124a represent the speed selection devices of the gearboxes 122, 123 and 124. The gearboxes 122 and 124 may be provided with reversing gear to allow groups of successive layers of the same hand to be wound, but normally the gearing is arranged to rotate the middle creel 118 in one direction and the other creels 117 and 119 in the reverse direction so that the layers are alternately of opposite hand throughout the winding. In the shafting 125, between the angle-drive gearbox 126 and the variable speed gearboxes, is arranged a one-way drive device 127 incorporating a reversing train of gears and two one-way clutches which causes the input shafting of the variable speed gearboxes to rotate always in the same direction irrespective of the direction of rotation of the winch 108, so that the creels always rotate in the same directions once winding has started. The creels 117, 118 and 119 each carry a multiplicity of thread bobbins 128 from which thread 129 is taken through guide devices peripherally distributed around the ring-shaped thread guides 114, 115 and 116 to the forming surface of the mandrel. Consequently, as the mandrel is reciprocated the creels are rotated at related speeds determined by the ratios to which the variable speed gearboxes are adjusted, and the threads are wound upon the mandrel in the form of helices the helix angles of which are dependent upon the ratios. Each creel is capable of carrying a sufficient number of bobbins to provide enough threads to cover the surface of the largest diameter mandrel completely in one pass with contiguous turns at the smallest helix angle required. When using a mandrel of smaller diameter, or winding a helix of larger helix angle, only the appropriate number of bobbins need be brought into use. It will be understood therefore that three layers of contiguous turns are wound upon the mandrel at each pass and that these three layers may each be wound with a different helix angle.

Owing to the clearance which must of necessity be maintained between the ring-shaped thread guides 114, 115 and 116 and the surface of the pipe being formed on the mandrel, slackness would develop in the threads, especially when winding at small helix angles, each time the direction of movement of the mandrel was reversed, unless the creels were kept rotating at a suitable minimum speed. To do this the shafting 125 is additionally driven by a constant speed motor 130 which is arranged to run at the desired minimum speed, a one-way clutch 131 being interposed to allow the shafting 125 to overrun the motor 130 when the drive is picked up again by the main motor 109. If found necessary, a brake 132 may be provided in the shafting 125 to prevent the creels overrunning both motors when the winch is being stopped by the brake 111. The brakes 111 and 132 are then applied together, but a centrifugal device is preferably provided in the brake 132 to release this brake as the speed reaches the minimum to be maintained.

When a desired number of layers of thread have been wound upon the mandrel, the machine is stopped and the mandrel drawn upwardly off the spindle 101, the threads being severed between the thread guides and the mandrel and the loose ends being secured as may be necessary.

FIGURES 2 to 5 illustrate a machine in which there is only a single ring-shaped thread guide, both the thread guide and the creel carrying the thread supply bobbins being stationary. The machine is consequently suitable for the manufacture of pipes and elongated bodies of such large diameter that, on account of the large number of threads involved, it would not be practical to rotate the creel or to duplicate it for the purpose of winding more than one layer at each pass. Furthermore the mandrel is arranged to rotate about a horizontal axis, which involves less difficulty than the vertical disposition when very long mandrels have to be used.

The machine comprises a headstock 10 and a tailstock 11 which are attached by clamps 12 and 13 to a tube 14, the clamp 13 being releasable so that the distance between the headstock and the tailstock may be adjusted according to the work in hand. Both the headstock 10 and the tailstock 11 are provided with flanged wheels 15 by which they run upon rails 16. The rails are laid in a trough-shaped emplacement 17 so that the axis of the headstock and tailstock is brought to a convenient working height above floor level 18. The tailstock 11 carries a spindle 19 for supporting the back end of a mandrel 20, shown as a plain cylindrical mandrel suitable for the manufacture of a large diameter pipe. It is to be understood however that within obvious limits mandrels can be used which are neither circular in cross-section nor of uniform cross-section. The spindle 19 is adjustable axially by a handle 21 and a usual form of locking device may be provided.

The headstock 10 carries a splined spindle 22 for supporting and driving the front end of the mandrel 20, the spindle being driven, through change-speed gearing 82 and 84 (FIGURE 6) contained in a gearbox 23 on the headstock, from a vertical shaft 24 which is itself driven through bevel gearing contained in a box 25 slung between the wheels. The driving shaft of the gearbox 25 carries a sprocket wheel engaging a chain 26, which extends from a point of attachment 27 on the headstock, over a driving unit sprocket wheel 28, through the tube 14, over a return sprocket wheel 29 and tensioning guide wheel 30, to an attachment bracket 31 on the back end of the tube 14. The driving unit which is mounted in an enlargement 32 at the end of the trough-shaped emplacement 17 includes a stationary constantly-running electric motor 33 driving a shaft 34 carrying the sprocket wheel 28 through a flexible coupling and speed-reduction and reverse gearing contained in a box 35. By engaging two solenoid-operated friction clutches 36 and 37 alternatively, the sprocket wheel 28 is made to accelerate from rest and turn at a constant speed in the one or the other direction to reciprocate the interconnected headstock and tailstock, while a solenoid-operated friction brake 38 is provided to act upon the sprocket wheel shaft 34 and absorb the energy of the system during the changeover from one clutch to the other. The driving unit is controlled through relays and a limit switch system, of conventional components, not shown, operated for example by strikers adjustably clamped on the tube 14, so that once the driving unit has been started, by operating a main switch, it continues to reciprocate the headstock and tailstock assembly, and the mandrel 20 held between them, through a distance not greater than the length of the mandrel. Naturally, if it is desired to wind thread upon only a part of the length of a mandrel, the distance moved through may be adjusted accordingly by re-positioning the strikers.

It will now be understood that as the chain 26 reciprocates the headstock and tailstock assembly it also rotates the headstock spindle 22 through the gearboxes 23 and 25 at a speed which is proportional to the instantaneous speed of translation, the relation between the two, and therefore the helix angle described by points on the surface of the mandrel, being dependent upon the diameter of the mandrel and the speed ratio to which the gearbox 23 is adjusted. The gearing 84 is a three-speed arrangement which can be quickly changed by a fork 86 so as to give different helix angles for successive layers. The gearing 82 is intended to give a wider range of initial adjustment of ratio, and includes removable change gears.

It will be noted that as the mandrel must continue to rotate in the same direction during successive passes, since otherwise the threads will unwind again unless they are clamped at the end of the preceding layer, a reversing mechanism must be incorporated in the drive between the chain and the mandrel. This mechanism takes the form of two bevel gears 56, 58 (FIGURE 7), in the box 25, meshing with a bevel gear 60 on the shaft 24 and driven alternatively from the sprocket wheel 62 through two oppositely acting free-wheel devices 64, 66 so that the shaft 24 rotates always in the same direction irrespective of the direction of rotation of the sprocket wheel.

Thread for winding on the mandrel is obtained from a multiplicity of bobbins 39 which are supported upon stationary creels 40 secured to the floor of the workshop on each side of the trough-shaped emplacement 17. The threads from these bobbins pass over tensioning and guide rollers 41 to an outer guide ring 42 surrounding the mandrel 20 and supported by a stationary frame 43 and metal plates 44. The outer guide ring 42 is of "squirrel cage" construction with a large number of bars 42a acting as guides for the threads arriving from the creels. The threads pass between the bars 42a to an inner guide ring 45 which is attached by plates 46 to the plates 44 supporting the outer guide ring. The inner guide ring 45 is provided with guide holes 45a for groups of threads, and is preferably readily exchangeable, since it is desirable, for a reason which will presently be clear, that the clearance between it and the mandrel to be used should not be greater than necessary.

As shown diagrammatically in FIGURE 5, the inner ring 45 is provided, for each guide hole 45a, with a comb-like device 49 which is pivoted at 49a to move in a plane radial to the axis of the mandrel and serves to spread the threads 47 passing through the hole 45a so that they are applied evenly to the surface of the mandrel. Arcuate bars 48 on each side of the combs 49 provide guidance in this plane. When the direction of reciprocation of the mandrel 20 is reversed, the combs can thus align themselves with the new direction of take-off of the threads indicated by the dotted line 50. The thread guide thus consists of the outer ring 42, the inner ring 45 and the devices 49.

Consideration of FIGURE 5 will also show that if rotation of the mandrel stops when its longitudinal movement ceases, an amount of slack will develop in the threads 47, when longitudinal movement in the reverse direction starts, which corresponds to the difference in length of the tangents from the guide 45a to the surface of the mandrel taken at the helix angle and in the transverse plane 51 respectively. For this reason the mandrel 20 must be kept rotating during the reversal phase at a speed which is sufficient to prevent this slack occurring. This is effected by providing a small electric motor 52 on the headstock 10 which is able to drive the spindle 22 through further speed reduction gearing 68 and a free-wheel arrangement 70 so that its speed is prevented from falling below the necessary minimum during the reversal phase and so that the spindle 22 overruns the motor 52 when the drive from the sprocket gearbox 25 again becomes effective. It will be seen that during reversals the helix angle decreases to zero and then increases again to its original value, but opposite in hand. To assist in preventing slipping of the threads during reversals, the mandrel may be provided with a circumferentially extending ridge just short of the limit of the winding. Due to the change in helix angle the wound-on layer increases in thickness at the ends of the winding, and if this is objectionable in the finished article the thickened end portions must be cut off. The length of the thickened portions depends upon the length of the "helix" tangent measured from the inner ring thread guides 48 to the surface of the mandrel, which is again dependent upon the radial spacing of the inner ring from the mandrel, so that this dimension should be kept to a minimum unless it is specially desired to produce articles with thickened ends of greater than the minimum length. When making articles upon mandrels which are not of constant circular cross-section throughout, the winding between the thickened ends will also depart from a true helix of constant angle. Since the helix angle varies inversely with the diameter of the mandrel, the effects are largely self-compensating in regard to the thickness of material laid on, but in the larger diameter parts, where the helix angle is least, there is a loss in longitudinal strength which should be borne in mind in the case of articles to be subjected to internal pressure. Preferably in making such articles the headstock gear ratio should be chosen to maintain the optimum helix angle at the largest diameter of the article. It is however possible by providing an infinitely variable gear in the headstock, controlled by a cam track fixed beside the rails 16, to maintain a constant helix angle along a mandrel which varies in diameter along its length.

Reverting to the arrangement shown in the drawings, electric current is supplied to the motor 52 through cable 53 wound on a drum 54 having a return spring so that slack is taken up during reciprocation of the headstock. The motor 52 is also provided with controls so that it may be used, when a winding has been completed and the main motor 33 has been stopped, for parting-off the thickened end portions of the winding, a suitable cutting tool being brought up on a transverse carriage, not shown. The motor 52 is also useful for "inching" the mandrel around when setting up the thread connections to the mandrel before starting a winding, and for other setting up purposes.

A polymerisable liquid resin bonding substance may be applied to the winding on the mandrel during its reciprocation by means of a roller 72 (FIGURE 8) pressed by a spring 74 against the winding adjacent the guide ring structure 42, 45, the roller either running partially immersed in a trough 76 containing the liquid resin, fed in at 78 and controlled by a constant-level device 80, or having the liquid resin distributed over its surface by other suitable means such as brushes or other rollers. Where the thickened ends of the winding are to be cut off it is of course not necessary to apply resin to these parts, so that a substantial quantity of the cut-off thread may be salvaged and used for other purposes. In another method of working, the winding may be completed before the bonding substance is applied. The mandrel with the winding upon it may for example be removed from the machine and immersed in a quantity of liquid bonding substance until the winding is completely impregnated. The mandrel is then taken out and excess bonding substance removed by means of a scraper, brush or roller. Alternatively the wound mandrel may be enclosed in a mould corresponding to the external dimensions of the finished article, and bonding substance then admitted to impregnate the winding and fill the mould, which is removed, together with the mandrel, after the bonding substance has been caused or allowed to set.

The reciprocating and rotary movements of the mandrel may also be obtained in various other ways. For example, a complete loop of chain may be kept running and the headstock engaged alternately with the oppositely moving runs by means of friction clutches operated mechanically by strikers, ramps or the like adjustably arranged in the path of the reciprocating assembly. In this case it would not be necessary to provide a separate motor to maintain the mandrel in rotation during reversals since one or other or both runs of the chain would always be moving relatively to the headstock. In another arrangement the main driving motor could be carried by the headstock, though this would not usually be desirable in view of the increased momentum of the reciprocating assembly.

Automatically operating means may also be provided for changing the ratio of the headstock gearing 84 after a desired number of passes has been made, so that the helix angle of the winding is changed and improved characteristics are imparted to it.

We claim:

1. A method of making pipe and other elongated hollow articles of circular or approximately circular cross-section, having a wall composed of a plurality of layers of helical or approximately helical turns of thread, the threads of successive layers crossing one another, and the turns and layers being bonded together with a solid resinous substance, including producing relative reciprocating movement between a mandrel and a thread guide peripherally surrounding the mandrel with clearance, the mandrel always remaining within the thread guide until the winding has been completed, producing relative rotation between the thread guide and the mandrel at a speed which during the greater part of the period of each pass of the mandrel relatively to the thread guide is directly proportional to the speed of relative reciprocation, but which speed is maintained at a positive value during reversals of direction of the reciprocating movement, feeding a sufficient number of threads in peripherally distributed arrangement through the thread guide onto the surface of the mandrel to form a layer at each pass, and making the rate of relative rotation of a thread guide to the mandrel during the greater part of one pass different from that rate during the greater part of another pass.

2. A method of making pipe and other elongated hollow articles of circular or approximately circular cross-section, having a wall composed of a plurality of layers of helical or approximately helical turns of thread, the threads of successive layers crossing one another, and the turns and layers being bonded together with a solid resinous substance, including producing relative reciprocating movement between a mandrel and a plurality of thread guides peripherally surrounding the mandrel with clearance, the mandrel always remaining within the thread guides until the winding has been completed, producing relative rotation between each thread guide and the mandrel at a speed which during the greater part of the period of each pass of the mandrel relatively to the thread guide is directly proportional to the speed of relative reciprocation, but which speed is maintained at a positive value during reversals of direction of the reciprocating movement, the rates of rotation of each thread guide relative to the mandrel during the greater part of each pass being different from one another, and feeding a sufficient number of threads in peripherally distributed arrangement through each thread guide onto the surface of the mandrel to form a layer at each pass.

3. A machine comprising a mandrel of substantially circular cross-section, a third guide peripherally surrounding the mandrel with clearance, a reversible power unit operatively connected to reciprocate the mandrel in the direction of its length and including means for determining the length of each pass so that the mandrel remains within the thread guide, means driven by the reversible power unit for producing relative rotation between the thread guide and the mandrel at a speed which during the greater part of the period of each pass is related to the speed of relative reciprocation but is always in the same direction during successive passes, a second power unit operatively connected to maintain the relative rotation at a positive value during reversals of direction of the reciprocating movement, and means for supplying a plurality of threads peripherally distributed to the thread guide.

4. A method according to claim 2 in which the mandrel is reciprocated vertically and the thread giude is rotated in a horizontal plane.

5. A method according to claim 2 in which the mandrel is reciprocated horizontally and is rotated, and the thread guide is stationary.

6. A method according to claim 2 in which the thickened parts produced at the ends of the pipe are cut off.

7. A machine comprising a mandrel of substantially circular cross section, a thread guide peripherally surrounding the mandrel with clearance, means for producing relative reciprocating movement between the mandrel and the thread guide, the reciprocating means including means for determining the length of each pass so that the mandrel remains within the thread guide, means for producing relative rotation between the thread guide and the mandrel at a speed which during the greater part of the period of each pass is directly proportional to the speed of relative reciprocation but is always in the same direction during successive passes, means for maintaining the relative rotation at a positive value during reversals of direction of the reciprocating movement, means for supplying a plurality of threads peripherally disturbed to the thread guide, and means for making the rate of relative rotation of the thread guide to the mandrel during the greater part of one pass different from that rate during the greater part of another pass.

8. A machine comprising a mandrel of substantially circular cross-section with its axis horizontal, means for reciprocating the mandrel in the direction of its length, means for rotating the mandrel at a speed dependent upon the instantaneous speed of reciprocation, but always in the same direction during successive passes, means for maintaining the mandrel in rotation during reversals of direction of the longitudinal movements, a stationary ring-shaped thread guide surrounding the axis of rotation of the mandrel, a stationary creel for a multiplicity of bobbins of thread, and means for guiding the thread from the bobbins in peripheral distribution to the ring-shaped thread guide.

9. A machine according to claim 8 in which said means for reciprocating the mandrel includes a motor for moving the mandrel longitudinally at a constant speed, means for reversing the direction of longitudinal movement, means for accelerating the mandrel to said constant speed at the beginning of each pass, means for braking the mandrel to a stop at the end of each pass, and the means for rotating the mandrel includes a rotary drive actuated by longitudinal movement of the mandrel for rotating the mandrel at a speed proportional to the longitudinal movement.

10. A machine according to claim 9 in which the motor is a stationary constantly-running motor, and the means for reversing the direction of movement and accelerating the mandrel is a reversing gear with a friction clutch for each direction of movement.

11. A machine according to claim 9 including a freewheel device permitting the mandrel to overrun the rotary drive, and a second motor for maintaining rotation of the mandrel at a minimum value when the speed of the rotary drive falls below that value.

12. A machine according to claim 11 in which the second motor is mounted on a carriage moving longitudinally with the mandrel.

13. A machine according to claim 8 in which said stationary ring-shaped thread guide includes a ring formed with a multiplicity of holes, and a thread spreader associated with each of the holes for spreading a group of threads passing from the hole to the surface of the mandrel.

14. In a device as claimed in claim 7, a common driving means for said reciprocating movement producing means and said rotation producing means, and means positively connecting said common driving means to said reciprocating movement producing means and said rotation producing means.

References Cited in the file of this patent

UNITED STATES PATENTS

| | | |
|---|---|---|
| 140,934 | Mayall | July 15, 1873 |
| 861,703 | Blakesley | July 30, 1907 |
| 2,093,206 | Muller | Sept. 14, 1937 |
| 2,139,011 | Furness | Dec. 6, 1938 |
| 2,422,234 | Goldman | June 17, 1947 |
| 2,656,873 | Stephens | Oct. 27, 1953 |
| 2,675,733 | Hemm et al. | Apr. 20, 1954 |
| 2,714,414 | De Ganahl et al. | Aug. 2, 1955 |
| 2,848,863 | Vanzo | Aug. 26, 1958 |